US012500894B2

(12) United States Patent
Smith, III et al.

(10) Patent No.: US 12,500,894 B2
(45) Date of Patent: Dec. 16, 2025

(54) METHOD AND APPARATUS FOR CREDENTIAL HANDLING

(71) Applicant: BeyondTrust Corporation, Ridgeland, MS (US)

(72) Inventors: John Burns Smith, III, Charlotte, NC (US); Nicholas Shawn Twerdochlib, Callahan, FL (US)

(73) Assignee: BeyondTrust Corporation, Johns Creek, GA (US)

( * ) Notice: Subject to any disclaimer, the term of this patent is extended or adjusted under 35 U.S.C. 154(b) by 0 days.

(21) Appl. No.: 18/464,382

(22) Filed: Sep. 11, 2023

(65) Prior Publication Data

US 2023/0421566 A1   Dec. 28, 2023

Related U.S. Application Data

(63) Continuation of application No. 16/548,564, filed on Aug. 22, 2019, now Pat. No. 11,863,558, which is a continuation of application No. 15/133,641, filed on Apr. 20, 2016, now Pat. No. 10,397,233.

(60) Provisional application No. 62/150,051, filed on Apr. 20, 2015.

(51) Int. Cl.
*H04L 9/40* (2022.01)

(52) U.S. Cl.
CPC ............ *H04L 63/102* (2013.01); *H04L 63/08* (2013.01); *H04L 63/0428* (2013.01)

(58) Field of Classification Search
CPC .... H04L 63/102; H04L 63/08; H04L 63/0428
See application file for complete search history.

(56) References Cited

U.S. PATENT DOCUMENTS

| | | | |
|---|---|---|---|
| 5,719,786 | A | 2/1998 | Nelson et al. |
| 5,835,724 | A | 11/1998 | Smith |
| 6,123,737 | A | 9/2000 | Sadowsky |
| 6,327,579 | B1 | 12/2001 | Crawford |
| 6,353,446 | B1 | 3/2002 | Vaughn et al. |

(Continued)

FOREIGN PATENT DOCUMENTS

| | | |
|---|---|---|
| DE | 60314347 T2 | 9/2007 |
| EP | 3965448 A1 | 3/2022 |

(Continued)

*Primary Examiner* — Sarah Su
(74) *Attorney, Agent, or Firm* — Bradley Arant Boult Cummings LLP; Daniel E. Sineway, Esq.; Adam J. Thompson, Esq.

(57) ABSTRACT

A privilege access management (PAM) appliance can receive an access request from an accessor device to access an endpoint device. The PAM appliance can establish a session via a secure connection between the accessor device and the endpoint device. The PAM appliance can transmit a request for credential information available for the accessor device to access the endpoint device from a credential management device. The credential management device can receive the request for credential information available for the accessor device to access the endpoint device. The credential management device can extract a set of credentials that are available for the accessor device from a plurality of credentials. The credential management device can provide at least one of the set of credentials to the endpoint device for the accessor device for the session.

20 Claims, 10 Drawing Sheets

(56) References Cited

U.S. PATENT DOCUMENTS

| | | |
|---|---|---|
| 6,466,654 B1 | 10/2002 | Cooper et al. |
| 6,879,600 B1 | 4/2005 | Jones et al. |
| 7,117,529 B1 | 10/2006 | O'Donnell et al. |
| 7,240,102 B1 | 7/2007 | Kouznetsov et al. |
| 7,346,922 B2 | 3/2008 | Miliefsky |
| 7,373,553 B2 | 5/2008 | Tripp et al. |
| 7,376,538 B1 | 5/2008 | Eatough |
| 7,539,627 B2 | 5/2009 | Schmidt |
| 7,539,733 B2 | 5/2009 | Mohammed et al. |
| 7,565,700 B2 | 7/2009 | Bellwood et al. |
| 7,587,588 B2 | 9/2009 | Clemmons et al. |
| 7,680,944 B1 | 3/2010 | Taghizadeh et al. |
| 7,908,401 B2 | 3/2011 | Chang |
| 7,941,848 B2 | 5/2011 | Yadav et al. |
| 7,958,247 B2 | 6/2011 | Abu-Samaha et al. |
| 8,024,399 B2 | 9/2011 | Reisman |
| 8,112,513 B2 | 2/2012 | Margulis |
| 8,156,205 B1 | 4/2012 | Forsberg et al. |
| 8,166,310 B2 | 4/2012 | Harrison et al. |
| 8,321,540 B2 | 11/2012 | Webb-Johnson |
| 8,335,831 B2 | 12/2012 | Fan et al. |
| 8,434,129 B2 | 4/2013 | Kannappan et al. |
| 8,443,435 B1 | 5/2013 | Schroeder |
| 8,527,774 B2 | 9/2013 | Fallows et al. |
| 8,544,069 B1 * | 9/2013 | Subbiah ............... H04L 63/08 726/4 |
| 8,665,728 B2 | 3/2014 | Altman |
| 8,850,516 B1 | 9/2014 | Irebicek et al. |
| 8,880,616 B2 | 11/2014 | Schuelke et al. |
| 8,924,459 B2 | 12/2014 | Gagne et al. |
| 8,966,075 B1 | 2/2015 | Chickering et al. |
| 9,055,055 B1 | 6/2015 | Strand et al. |
| 9,178,773 B1 | 11/2015 | Tassone et al. |
| 9,246,979 B2 | 1/2016 | Bomgaars et al. |
| 9,305,182 B1 | 4/2016 | Berls et al. |
| 9,313,080 B2 | 4/2016 | Rowe |
| 9,350,548 B2 | 5/2016 | Bagley |
| 9,712,514 B2 | 7/2017 | Breiman et al. |
| 9,754,303 B1 | 9/2017 | Jagtap et al. |
| 10,069,914 B1 * | 9/2018 | Smith ............... H04L 67/568 |
| 2001/0036176 A1 | 11/2001 | Girard |
| 2001/0051890 A1 | 12/2001 | Burgess |
| 2002/0075844 A1 | 6/2002 | Hagen |
| 2002/0091819 A1 | 7/2002 | Melchione et al. |
| 2002/0120749 A1 | 8/2002 | Widegren et al. |
| 2002/0161895 A1 | 10/2002 | Appiah et al. |
| 2002/0169783 A1 | 11/2002 | Kreulen et al. |
| 2003/0004791 A1 | 1/2003 | Kojima |
| 2003/0008265 A1 | 1/2003 | Hulet |
| 2003/0009754 A1 | 1/2003 | Rowley et al. |
| 2003/0018704 A1 | 1/2003 | Polychronidis et al. |
| 2003/0023476 A1 | 1/2003 | Gainey |
| 2003/0033308 A1 | 2/2003 | Patel et al. |
| 2003/0065731 A1 | 4/2003 | Mohammed et al. |
| 2003/0065738 A1 | 4/2003 | Yang et al. |
| 2003/0084010 A1 | 5/2003 | Bigus et al. |
| 2003/0093530 A1 | 5/2003 | Syed |
| 2003/0093692 A1 | 5/2003 | Porras |
| 2003/0120135 A1 | 6/2003 | Gopinathan et al. |
| 2003/0120557 A1 | 6/2003 | Evans et al. |
| 2003/0131084 A1 | 7/2003 | Pizzorni et al. |
| 2003/0149740 A1 | 8/2003 | Wookey et al. |
| 2003/0225905 A1 | 12/2003 | Scifres et al. |
| 2003/0233432 A1 | 12/2003 | Davis et al. |
| 2004/0001514 A1 | 1/2004 | Wookey et al. |
| 2004/0003073 A1 | 1/2004 | Krzyzanowski et al. |
| 2004/0153712 A1 | 8/2004 | Owhadi et al. |
| 2004/0173059 A1 | 9/2004 | Klein et al. |
| 2004/0249975 A1 | 12/2004 | Tuck et al. |
| 2005/0021652 A1 | 1/2005 | McCormack |
| 2005/0038827 A1 | 2/2005 | Hooks |
| 2005/0050319 A1 | 3/2005 | Suraski |
| 2005/0080897 A1 | 4/2005 | Braun et al. |
| 2005/0132030 A1 | 6/2005 | Hopen et al. |
| 2005/0177869 A1 | 8/2005 | Savage et al. |
| 2005/0190769 A1 | 9/2005 | Smith |
| 2005/0234824 A1 | 10/2005 | Gill et al. |
| 2005/0289226 A1 | 12/2005 | Mohammed et al. |
| 2006/0010485 A1 | 1/2006 | Gorman |
| 2006/0017551 A1 | 1/2006 | Neher et al. |
| 2006/0031537 A1 | 2/2006 | Boutboul et al. |
| 2006/0047927 A1 | 3/2006 | Xing et al. |
| 2006/0053447 A1 | 3/2006 | Krzyzanowski et al. |
| 2006/0064582 A1 | 3/2006 | Teal et al. |
| 2006/0072721 A1 | 4/2006 | Wisniewski |
| 2006/0159243 A1 | 7/2006 | Mangione et al. |
| 2006/0239235 A1 | 10/2006 | Oswal et al. |
| 2006/0248522 A1 | 11/2006 | Lakshminarayanan et al. |
| 2006/0271968 A1 | 11/2006 | Zellner |
| 2006/0277287 A1 | 12/2006 | McCall et al. |
| 2007/0021138 A1 | 1/2007 | Allen et al. |
| 2007/0033265 A1 | 2/2007 | Anderson et al. |
| 2007/0044034 A1 | 2/2007 | Nieves |
| 2007/0047459 A1 | 3/2007 | Kadaba |
| 2007/0054686 A1 | 3/2007 | Allen et al. |
| 2007/0067098 A1 | 3/2007 | Zelentsov |
| 2007/0094716 A1 | 4/2007 | Farino et al. |
| 2007/0130457 A1 | 6/2007 | Kamat et al. |
| 2007/0143824 A1 | 6/2007 | Shahbazi |
| 2007/0176787 A1 | 8/2007 | Iten et al. |
| 2007/0180501 A1 | 8/2007 | Yadav et al. |
| 2007/0218875 A1 | 9/2007 | Calhoun et al. |
| 2007/0239884 A1 | 10/2007 | Karmakar et al. |
| 2007/0253418 A1 | 11/2007 | Shiri et al. |
| 2007/0255604 A1 | 11/2007 | Seelig |
| 2007/0260673 A1 | 11/2007 | Shenfield et al. |
| 2007/0268837 A1 | 11/2007 | Melton et al. |
| 2007/0294368 A1 | 12/2007 | Bomgaars et al. |
| 2007/0299953 A1 | 12/2007 | Walker et al. |
| 2007/0300291 A1 | 12/2007 | Bomgaars et al. |
| 2008/0010480 A1 | 1/2008 | Hurley et al. |
| 2008/0034060 A1 | 2/2008 | Fisher |
| 2008/0040441 A1 | 2/2008 | Maes |
| 2008/0065236 A1 | 3/2008 | Bristol |
| 2008/0091454 A1 | 4/2008 | Fisher |
| 2008/0172574 A1 | 7/2008 | Fisher |
| 2008/0184241 A1 | 7/2008 | Headrick et al. |
| 2008/0244705 A1 | 10/2008 | Cromer et al. |
| 2008/0256616 A1 * | 10/2008 | Guarraci ............... H04L 9/3242 726/5 |
| 2009/0007217 A1 | 1/2009 | Birger et al. |
| 2009/0019367 A1 | 1/2009 | Cavagnari et al. |
| 2009/0052675 A1 | 2/2009 | Levow et al. |
| 2009/0077184 A1 | 3/2009 | Brewer et al. |
| 2009/0164554 A1 | 6/2009 | Wei |
| 2009/0187651 A1 | 7/2009 | Schuckenbrock et al. |
| 2009/0199276 A1 | 8/2009 | Schneider |
| 2009/0201303 A1 | 8/2009 | Westerhoff et al. |
| 2009/0248794 A1 | 10/2009 | Helms et al. |
| 2009/0271472 A1 | 10/2009 | Scheifler et al. |
| 2009/0299793 A1 | 12/2009 | Guzel |
| 2010/0071043 A1 | 3/2010 | Babula et al. |
| 2010/0138270 A1 | 6/2010 | Werth et al. |
| 2010/0154009 A1 | 6/2010 | Del Sordo |
| 2010/0169497 A1 | 7/2010 | Klimentiev et al. |
| 2010/0192020 A1 | 7/2010 | Van Riel et al. |
| 2010/0192146 A1 | 7/2010 | Stay |
| 2010/0248742 A1 | 9/2010 | Song et al. |
| 2010/0257596 A1 | 10/2010 | Ngo et al. |
| 2010/0281519 A1 | 11/2010 | Das et al. |
| 2011/0099604 A1 | 4/2011 | Zhou et al. |
| 2011/0107406 A1 | 5/2011 | Frost et al. |
| 2011/0154231 A1 | 6/2011 | Cherdron et al. |
| 2011/0191799 A1 | 8/2011 | Raza et al. |
| 2011/0273294 A1 | 11/2011 | Harwell |
| 2011/0276683 A1 | 11/2011 | Goldschlag et al. |
| 2011/0277027 A1 | 11/2011 | Hayton et al. |
| 2011/0302629 A1 | 12/2011 | Whitson et al. |
| 2012/0005746 A1 | 1/2012 | Wei et al. |
| 2012/0117212 A1 | 5/2012 | Fries |
| 2012/0147894 A1 | 6/2012 | Mulligan et al. |
| 2012/0265976 A1 | 10/2012 | Spiers et al. |
| 2012/0311564 A1 | 12/2012 | Khalid |
| 2012/0331524 A1 | 12/2012 | Mower et al. |

(56) References Cited

U.S. PATENT DOCUMENTS

| | | |
|---|---|---|
| 2013/0081112 A1 | 3/2013 | Kelly |
| 2013/0114610 A1 | 5/2013 | Polcyn et al. |
| 2013/0263216 A1 | 10/2013 | Vakil et al. |
| 2013/0291078 A1 | 10/2013 | Mcfarland et al. |
| 2014/0013409 A1 | 1/2014 | Halageri |
| 2014/0172783 A1 | 6/2014 | Suzuki et al. |
| 2014/0173594 A1 | 6/2014 | Ng et al. |
| 2014/0188676 A1 | 7/2014 | Marmolejo-Meillon et al. |
| 2014/0337834 A1 | 11/2014 | Adogla |
| 2015/0020164 A1 | 1/2015 | Tankov et al. |
| 2015/0067171 A1 | 3/2015 | Yum et al. |
| 2015/0089620 A1 | 3/2015 | Manza et al. |
| 2015/0200821 A1 | 7/2015 | Sade et al. |
| 2015/0227926 A1 | 8/2015 | Grigg et al. |
| 2015/0264035 A1 | 9/2015 | Waterhouse et al. |
| 2015/0288672 A1 | 10/2015 | Patten et al. |
| 2015/0304292 A1 | 10/2015 | Dulkin et al. |
| 2015/0350019 A1 | 12/2015 | Terayama et al. |
| 2015/0381593 A1 | 12/2015 | Low et al. |
| 2016/0050160 A1 | 2/2016 | Li et al. |
| 2016/0055026 A1 | 2/2016 | Fitzgerald et al. |
| 2016/0119374 A1* | 4/2016 | Williams ............... H04L 9/3263 713/175 |
| 2016/0173464 A1 | 6/2016 | Wang et al. |
| 2016/0191473 A1 | 6/2016 | De Wasch |
| 2016/0234198 A1* | 8/2016 | Breiman ............... H04L 67/141 |
| 2016/0286003 A1 | 9/2016 | Pessis et al. |
| 2016/0299790 A1 | 10/2016 | Wagner et al. |
| 2016/0301675 A1 | 10/2016 | Wiles et al. |
| 2016/0308876 A1 | 10/2016 | Smith, III et al. |
| 2016/0308906 A1 | 10/2016 | Hasson et al. |
| 2017/0286363 A1 | 10/2017 | Joshua et al. |
| 2017/0300687 A1* | 10/2017 | Cherukuri ........... H04L 63/0815 |
| 2018/0114005 A1* | 4/2018 | Friedman ............ H04L 63/0884 |
| 2018/0248916 A1* | 8/2018 | Hasson .................. H04L 63/20 |
| 2018/0373887 A1* | 12/2018 | Smith ................. G06F 21/6227 |
| 2019/0075115 A1* | 3/2019 | Anderson ............. H04L 63/068 |
| 2019/0205524 A1* | 7/2019 | Cherukuri ........... H04W 12/068 |
| 2022/0329612 A1* | 10/2022 | Verma ................. H04L 63/1441 |
| 2024/0098075 A1* | 3/2024 | Das ........................ H04L 63/08 |
| 2025/0225246 A1* | 7/2025 | Ben-Noon ............. G06F 21/44 |

FOREIGN PATENT DOCUMENTS

| | | | |
|---|---|---|---|
| KR | 20060127571 A | 12/2006 | |
| WO | 2005032892 A1 | 4/2005 | |
| WO | WO-2006055714 A2 * | 5/2006 | ........... G06F 21/121 |
| WO | 2006134291 A1 | 12/2006 | |
| WO | 2007026914 A1 | 3/2007 | |
| WO | 2014160993 A1 | 10/2014 | |
| WO | 2021028052 A1 | 2/2021 | |
| WO | WO-2021050306 A1 * | 3/2021 | ......... H04L 67/5682 |

* cited by examiner

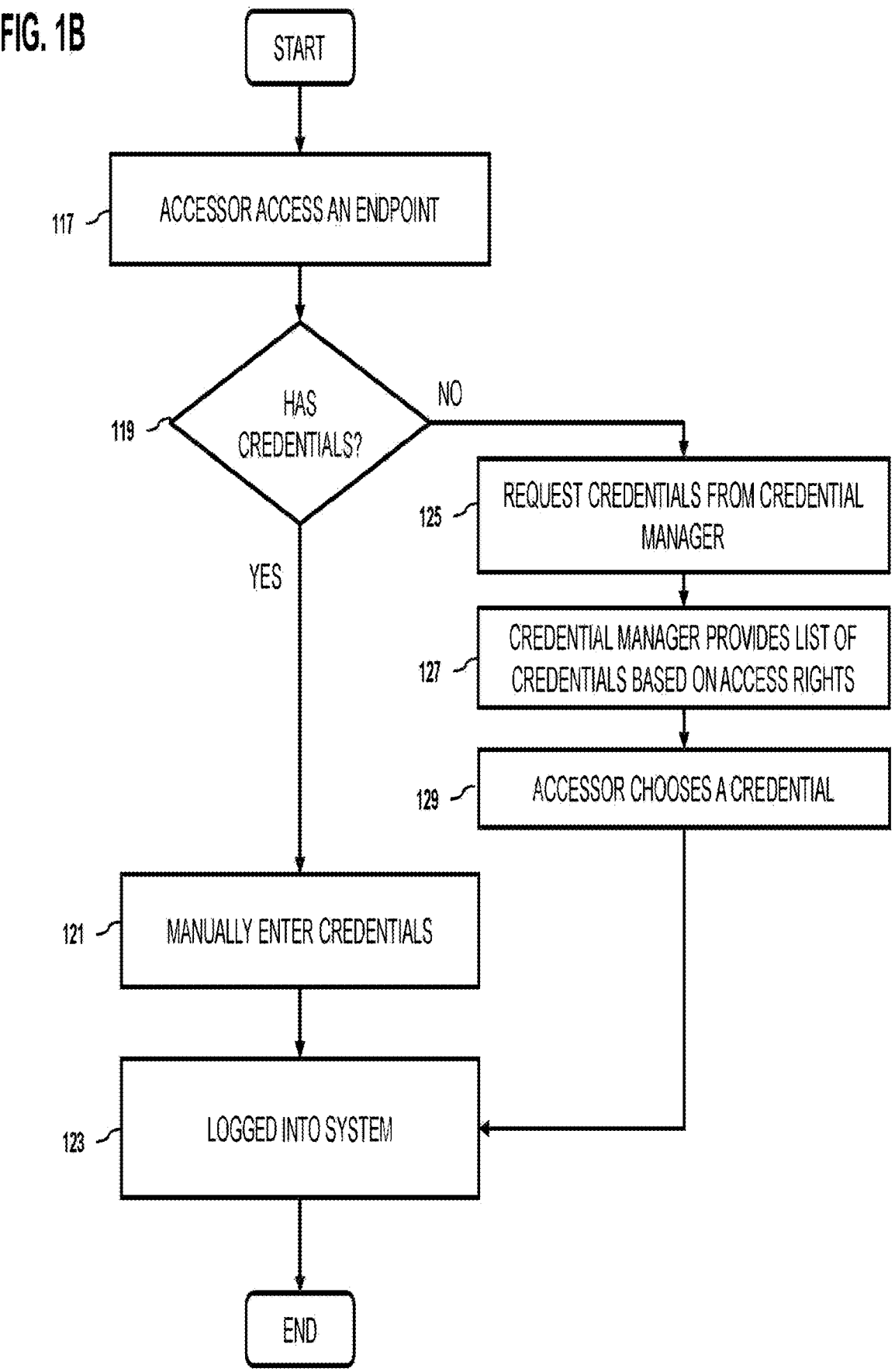

METHOD AND APPARATUS FOR CREDENTIAL HANDLING

CROSS-REFERENCE TO RELATED APPLICATIONS

This application is a continuation of U.S. patent application Ser. No. 16/548,564, filed Aug. 22, 2019 and entitled "METHOD AND APPARATUS FOR CREDENTIAL HANDLING," which is a continuation of U.S. patent application Ser. No. 15/133,641, now U.S. Pat. No. 10,397,233, filed Apr. 20, 2016 and entitled "METHOD AND APPARATUS FOR CREDENTIAL HANDLING," which claims the benefit of, and priority to, U.S. Provisional Application No. 62/150,051, filed Apr. 20, 2015 and entitled "Method and Apparatus for Credential Handling," the disclosures of which are incorporated by reference as if set forth herein in their entries.

BACKGROUND OF THE INVENTION

Traditional means of authenticating to computer systems and computer applications involve knowing a username and password. This results in password being an important piece of information that needs to be protected since a password leak could lead to unauthorized access to computer systems or applications resulting in business losses. Remembering a multitude of usernames and passwords can be cumbersome and error-prone which can potentially lead to insecure practices such using the same passwords across applications and systems which in turn increases the risk when a password is leaked.

Traditional two-factor authentication systems overcome some of these problems by using a physical token and password whereby just the loss of password does not compromise security. However, two-factor authentication can be expensive to install, use, maintain, and administer. In addition, many users are more familiar with single username and password use, and introducing a physical token and/or other means of delivering and using software tokens can result in productivity loss caused by having to adjust to a new security regime. Furthermore, various legacy applications and systems do not support two-factor authentication.

Restricting access to computer systems and applications to a select few individuals, carefully disseminating credential information, frequently changing passwords, monitoring, and auditing access are other traditional means of securing password use. But all of these approaches can be prone to human error resulting in password leakage either by accident, due to malware, phishing or some other cyberattack.

When granting internal system access to third-party entities, the challenges of securing credentials multiply as an organization may not have complete control over security, operating, and business practices of a third-party.

Based on the foregoing, there is a need for secure and automated credential handling such that credentials are not revealed except at the point of need and transported to the endpoint or application using cryptographically sound transport mechanisms.

BRIEF DESCRIPTION OF THE DRAWINGS

FIGS. 1A and 1B are, respectively, diagrams of a system and associated process for automated credential handling, according to certain embodiments.

DESCRIPTION OF THE PREFERRED EMBODIMENT

An apparatus, method, and software for credential handling for access to endpoints or applications is described. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

When embodiments are described with respect to a wired network, it is contemplated that these embodiments have applicability to other networks including wireless systems. Similarly when embodiments are described with respect to computing devices they have applicability to physical, virtual, mobile, handheld, headless, and graphical devices and systems.

Figure 1A:
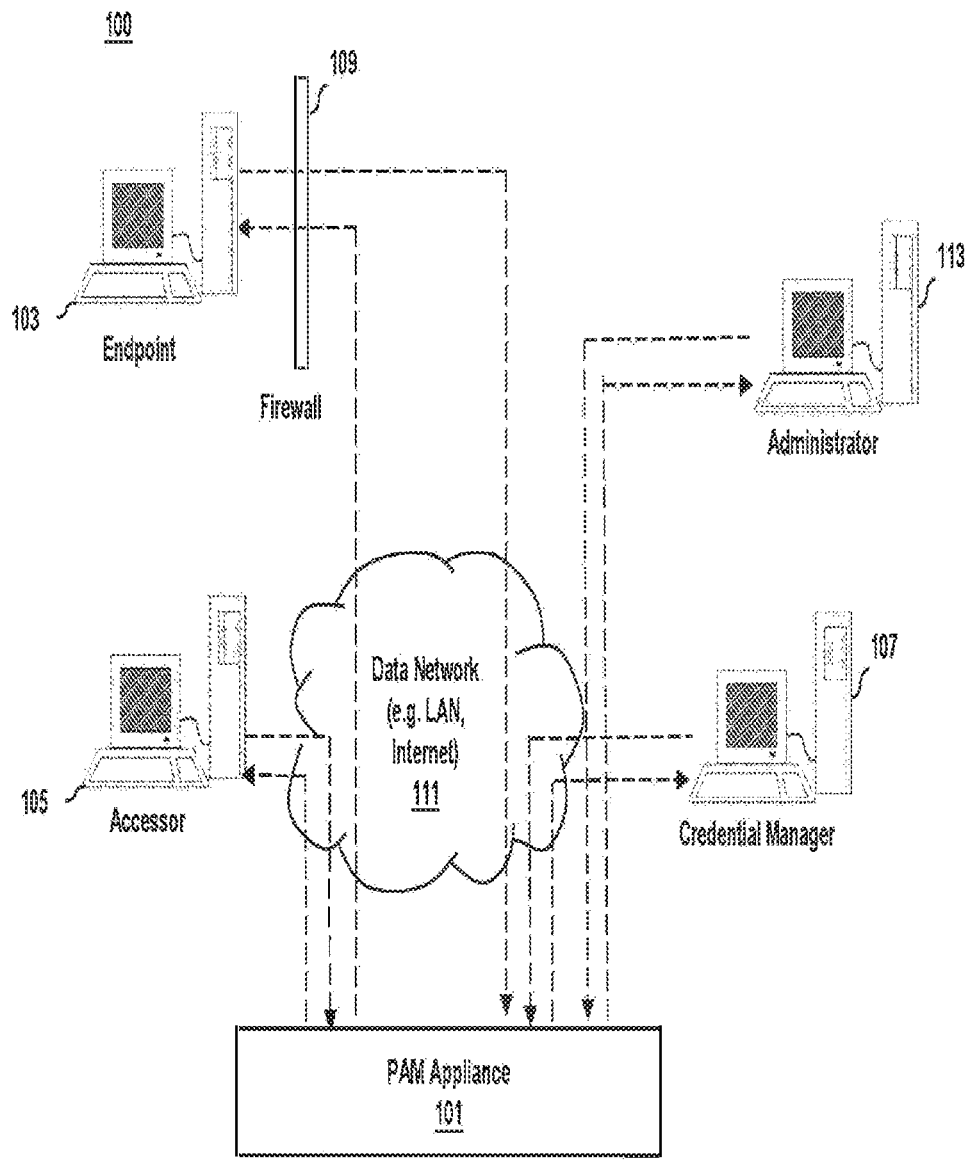

FIGS. 1A and 1B are, respectively, diagrams of a system and associated process for automating credential handling in order to gain access to endpoints or applications by accessors, and administrators, according to certain embodiments. For purposes of illustration, a communication system 100 (FIG. 1A) is described with respect to providing and enforcing real time access control to a customer network, as facilitated by a privileged access management appliance (PAM appliance) 101, among endpoint system 103, accessor system 105, credential manager 107, firewall 109, and administrator system 113, thereby enabling, for example, automated credential handling for providing access to resources (including software or applications available, as well as storage/database and hardware capabilities) of the endpoint system 103. In certain embodiments, the systems may include the users of each system, such as the user of the endpoint system 103, user accessor of the accessor system 105, administrative user of the administrator system 113, and agent user of the protocol agent described under FIG. 3. The appliance 101 is further connected to the other systems through the data network 111. According to one embodiment, the appliance 101 can be implemented as a standalone hardware device; alternatively, the appliance 101 can be virtualized—i.e., virtual appliance. The appliance 101 may commonly be referred to as the PAM appliance, network appliance, or just appliance.

In one embodiment, a PAM appliance 101 (e.g., along with or configured with a Credential Manager 107) provides, in certain embodiments, an automated credential selection, injection and access mechanism that is secure, easy to use, provides granular access controls, and implemented in a turn-key fashion. For the purposes of illustration, the appliance 101 can be deployed by an organization and accessed by entities that are either internal or external to that organization. In certain embodiments, the PAM appliance 101 can be implemented to accommodate access, credential selection, and injection from mobile systems and means to contact those mobile systems even when disconnected from PAM appliance 101.

In the scenario of FIG. 1A, the deployed appliance 101 can serve as a remote access, access control, access management, audit, credential selection, credential injection, and reporting system for the organization. In one embodiment, the appliance is implemented according to an onsite deployment model. A hosted Software-as-a-Service (Saas) model can also be an offering of this approach. In addition, the appliance can be further defined as a physical or virtual computing system. This can include but not limited to a server rack-mountable server, non-rack-mountable server, desktop computer, laptop computer, and virtual machines.

Additionally, the PAM appliance 101 has the capability of allowing on-demand product use from anywhere in the world. For example, as long as the network appliance is deployed accessible via a public IP address, an accessor or administrator can log in to his/her account via a web interface hosted on the network appliance or use a mobile application to connect to and gain access to the appliance or the endpoint and automatically select and inject credentials as long as they have such access.

An Access console (i.e., local client, accessor application/client, or web client) can be downloaded from a web interface for remote access to endpoints, request credentials when needed, monitor ongoing sessions, and verify granted access. Also, an endpoint console (i.e., remote client, endpoint application/client, or web client) can be downloaded from administrative interface hosted on the PAM appliance 101—this endpoint client 103 further can be distributed to endpoints to enable them for secure remote access and credential injection. In another embodiment these clients can be downloaded from a third party hosted or Organization's self-hosted download location or mobile application stores. Endpoint clients 103 can automatically uninstall themselves at the end of access period or session for additional security.

The appliance 101, in various embodiments, executes software applications that can receive, handle, manage, and dispatch system or data messages to and from the Access Consoles and Endpoint Clients via a secure connection (e.g., 256-bit Advance Encryption Standard (AES) Transport Layer Security (TLS)).

As seen in FIG. 1A, an Accessor system (or device) 105 can access an endpoint 103 via PAM appliance 101. The accessor system 105 is a device attempting to access endpoint system (or device) 103 or resources of the endpoint system 103 through the network. The accessor system 105 also may be defined by unique characteristics such as IP address, MAC address, machine certificates, etc. The traffic between all systems, endpoint system 103, accessor system 105, administrator system 113, and credential manager 107 is handled and managed at the appliance 101. To facilitate broadest reach and to easily work through firewalls and proxy servers, the system is designed such that all connections from the clients, agents, and managers are initiated outbound towards the appliance 101.

According to one embodiment, the operation of the accessor system 105 is depicted in FIG. 1B. In step 117, the process detects an attempt to establish (or that a session has been established and is on-going) by an accessor system (or device) 105 *a* session with endpoint system 103 appliance 101. In step 119, the PAM appliance 101 determines if the user accessor or accessor system 105 has credentials to access the resources at the endpoint system 103. Under such a scenario, the credentials may be received by the PAM appliance 101 from the credential manager 107 by the PAM appliance 101 querying the credential manager 107 for the accessor system 105. Based on such a determination of whether the credentials exist, the known credentials are then transmitted and/or openly provided to the endpoint system 103 for logging the accessor system 105 into the endpoint system 103, per step 121 and 123. In step 125, should no credentials be found for the accessor system 105 be found, the credential manager may provide a plurality of different credentials for the accessor device and/or user of the accessor device to select from. Under such a scenario, the set of credentials is requested by the PAM appliance 101 from the credential manager 107, and then, per step 127 transient identifiers for each of the credentials in the set are then provided to the accessor system 105. The credentials themselves are never provided directly to the accessor system 105 in order to maintain a strong security posture and confidentiality of the credentials themselves. In step 129, the accessor system 105, which has been provided with the set of credentials, then automatically selects or presents the set to the user of the accessor system 105. The provided credentials are selected from and the selected credential is provided to the PAM appliance 101 for logging into the endpoint system 103.

Figure 2:
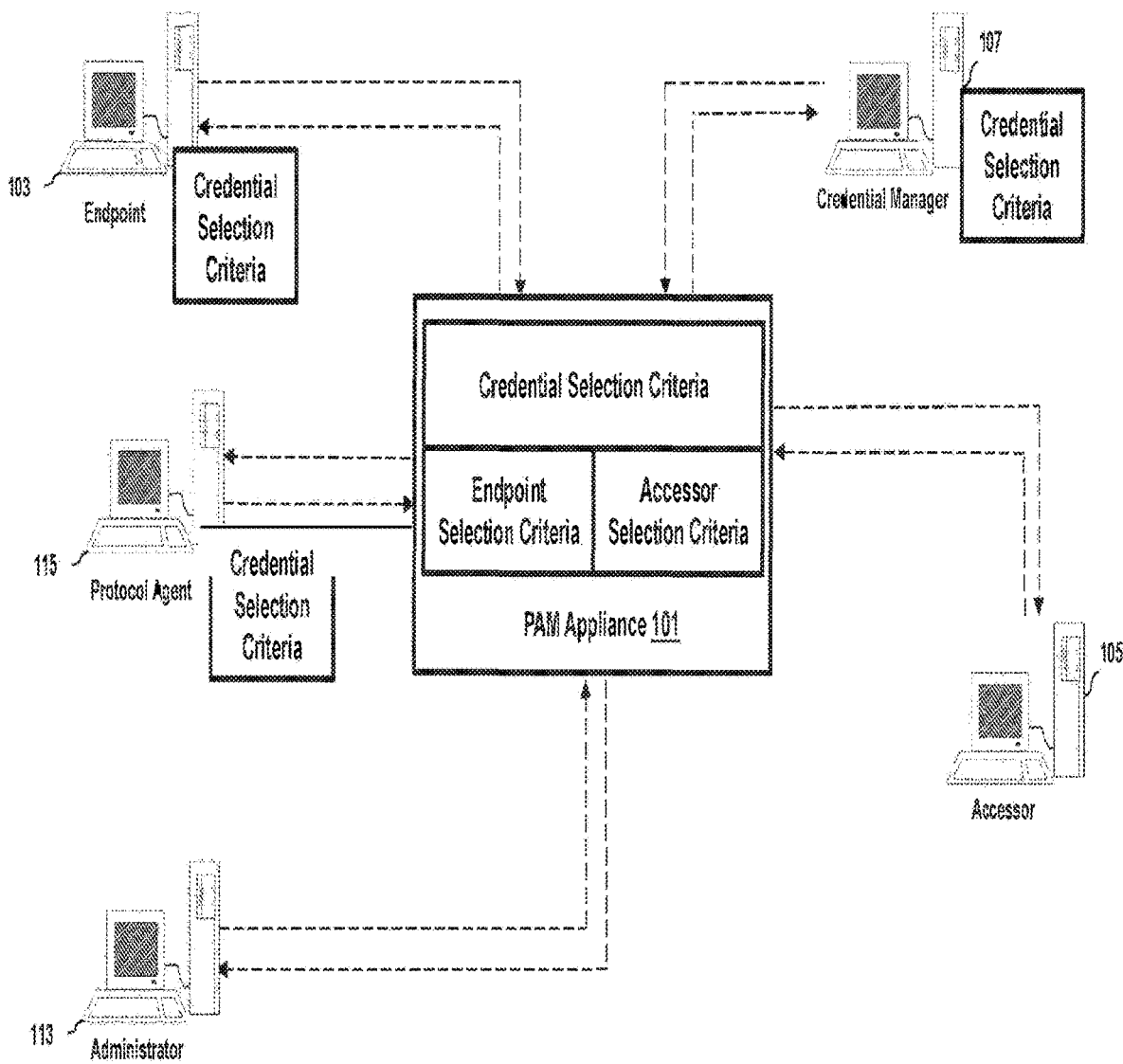
FIG. 2 is diagram of a credential selection, granting, and injecting mechanism, according to certain embodiments.

FIG. 2 is a diagram of a system for providing automated credential selection and injection, according to certain embodiments. In one embodiment, a PAM appliance 101 and/or a Credentials Manager 107 consists, among other means, a web server, applications, databases, downloadable installers, tools for appliance management, communication mechanisms, means for storing recordings, recording viewers, and self-checking mechanisms. Web applications are used by Administrators in setting up credential selection criteria, assigning those criteria to endpoint system 103, accessor system 105, and applications. Selection criteria can be setup to restrict available credentials based on accessor system 105, endpoint system 103, location of endpoint, location of accessor, application, method of access, time of day, and duration. Selection criteria can be setup to use one or all of the available criteria or any combination thereof. Storage mechanisms, such as databases and encrypted key-value on-disk storage systems are used for storing and retrieving credentials, criteria, event information, log data, and audit trail.

By way of example, two example approaches to selecting and injecting credentials according to various embodiments are described. In one embodiment, one approach provides login access to an endpoint by an accessor. In this scenario, an accessor using an Access console, selects the endpoint from a list of endpoints that he or she has access to and requests access. Since the accessor has login access to the selected endpoint, the PAM appliance 101 will establish a session between the endpoint and the accessor. Once the session is established PAM appliance 101 contacts Credential Manager 107 to securely extract credentials that are available for this accessor system 105 on the endpoint system 103. Only the names, nick names, or other identification information of the credential are shown to the accessor system 105 as choices. If only one credential is available or based on accessor choice when multiple are available, full credential information is transported securely from Credential Manager 107 to the requested endpoint via the PAM appliance 101.

In one embodiment, at no point in transport of credentials would the accessor or accessor's machine have access to the full credential information either encrypted or otherwise. Once the transport is successfully completed to endpoint, the endpoint client will securely inject the credential information for a successful login. By way of example, injection mechanisms can range from programmatic methods like Windows Credential Provider, proxy-based credential injection into protocol stream, to automatically enter keystrokes or otherwise copy credential information into password fields. In one embodiment, credentials are transported over TLS data stream and are protected by a single use private-public key pair valid for duration of a single transfer. In one embodiment, establishment of this key-pair, encryption and decryption of credentials is handled at a last process in execution chain just before handing off a clear text credential to an application or OS process and clear text credential exists for the shortest duration of time possible.

In another approach, the accessor has access to two types of credentials for use, a non-privileged credential for login and a privileged credential (e.g., for use as Run As in Windows environments). Under this scenario or embodiment, an accessor will gain access to the endpoint using the non-privileged credential, for instance, via a process described previously. Once logged in and accessing the endpoint, in Access Console, the accessor can choose a UI mechanism to run applications on the end point as a different user. When the accessor chooses an application from a list or types a freeform command, the PAM appliance 101 will contact the Credential Manager 107 on behalf of the accessor, securely retrieve credentials, and if only one is available transport it to endpoint for use to launch the selected application or command using the provided credential. If multiple privileged credentials are available, a list of names, nicknames, or other identifier of the credentials are displayed to the accessor. In one embodiment, at no point in transport of the credentials would the accessor or accessor's machine will have access to the full credential information either encrypted or otherwise. Windows specific mechanisms are outlined for illustrative purposes, similar mechanisms exist and are available for use on other OSes and platforms.

In one embodiment, Accessors 105, Administrators 113, Protocol Agents 115, and Endpoints 103 can either be internal or external to the organization that owns PAM appliance 101. Credential selection and injection can be enforced in any combination of available credentials, location, method of use, grouping, privilege level, and approval. In one embodiment, an accessor can gain access to a credential only for a particular endpoint for a certain duration and only on a certain day and only when accessing from a desktop computer on the internal LAN of the organization. As another embodiment, an accessor can access a credential for use on any endpoint but only at a certain time of day for certain duration and only for a certain application on the endpoint while not on the internal network but can use that credential for any application while on the internal network of the organization. These embodiments are provided by way of illustration and not limitation. Accordingly, it is contemplated that any temporal or other restriction or policy can be applied to control access to credentials.

In one embodiment, the Credential Manager 107 can store, retrieve, and manage credentials by itself or make use of a pre-existing credential handling entity. When using a pre-existing entity, the Credential Manager 107 can act as middleware to integrate with a single or a plurality of credential handling and management entities.

Figure 3:
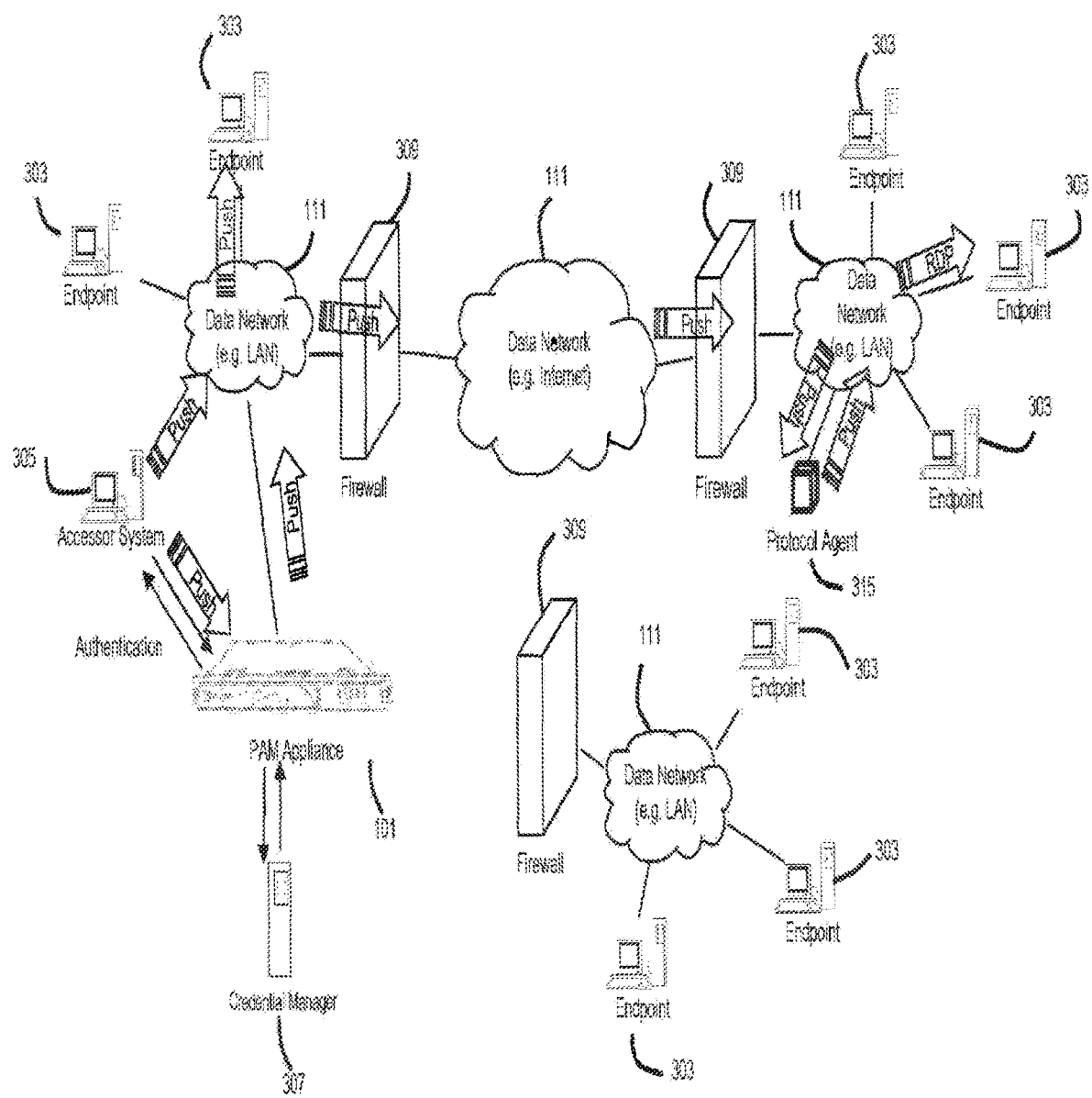
FIG. 3 is a diagram of a system capable of providing clientless access within local area network (LAN) as well as remote networks while automatically injecting credentials at endpoints, according to one embodiment.

FIG. 3 is a diagram illustrating clientless access to endpoints with automated credential handling. This diagram illustrates a system and associated processes for providing access to endpoints via a PAM appliance 101 and/or Credential Manager 307 as an agent or a proxy, according to certain embodiments. In this embodiment endpoint access application is pushed to an endpoint, executed, and connected back to the accessor via PAM appliance 101. Push action can be achieved either directly from PAM appliance 101 or via the means of a Protocol Agent 315. In one embodiment Protocol Agent 315 pushes and automatically executes an endpoint client on an endpoint on behalf of the appliance. In another embodiment Protocol Agent converts the access protocol used by the appliance to a protocol that is used by the endpoint for providing access.

In one embodiment Protocol Agent 315 connects to the end point 303 using RDP and connects to the PAM appliance 101, through firewalls 309, using a proprietary protocol. In this embodiment RDP access is restricted to the endpoints 303 from the public internet 111, but since Protocol Agent 315 can connect outbound to the appliance 101 and can connect using RDP inbound to the endpoint 303 on local LAN 111, Protocol Agent 315 has effectively and securely bridged access between disparate networks and protocols. In other embodiments protocols like VNC, SSH, and vPro are bridged. While accessing endpoint 303 via a Protocol Agent 315, an accessor 305 can request, select, and inject credentials. This selection and injection would follow similar model as described above. In cases where endpoint credential injection directly at the endpoint 303 is not feasible, Protocol Agent 315 is used to affect credential injection. In this method full credential information does not traverse through the accessor machine 305. Similarly in another embodiment full credential information is not provided to the endpoint either. In such embodiment, Protocol Agent 315 has access to the full credential for use on endpoint 303. In certain embodiments mechanisms such as Kerberos and NTLM are used to establish a session between accessor's access console and endpoint 303 either directly or via PAM appliance 101.

In one embodiment, a plurality of Accessors 305 can access the system at any given time. While Accessors 305 are in access sessions with endpoints 303 they can invite other accessors 305 into their session to provide guidance or help. Invited accessors 305 can select and inject credentials available to them on this endpoint 303 based on the selection criteria as defined by the administrator and enforced by the Credential Manager 307 and/or PAM appliance 101.

In certain embodiments PAM appliance 101, Credential Manager 307, and Protocol Agent 315 can be on the same appliance.

Figure 4:
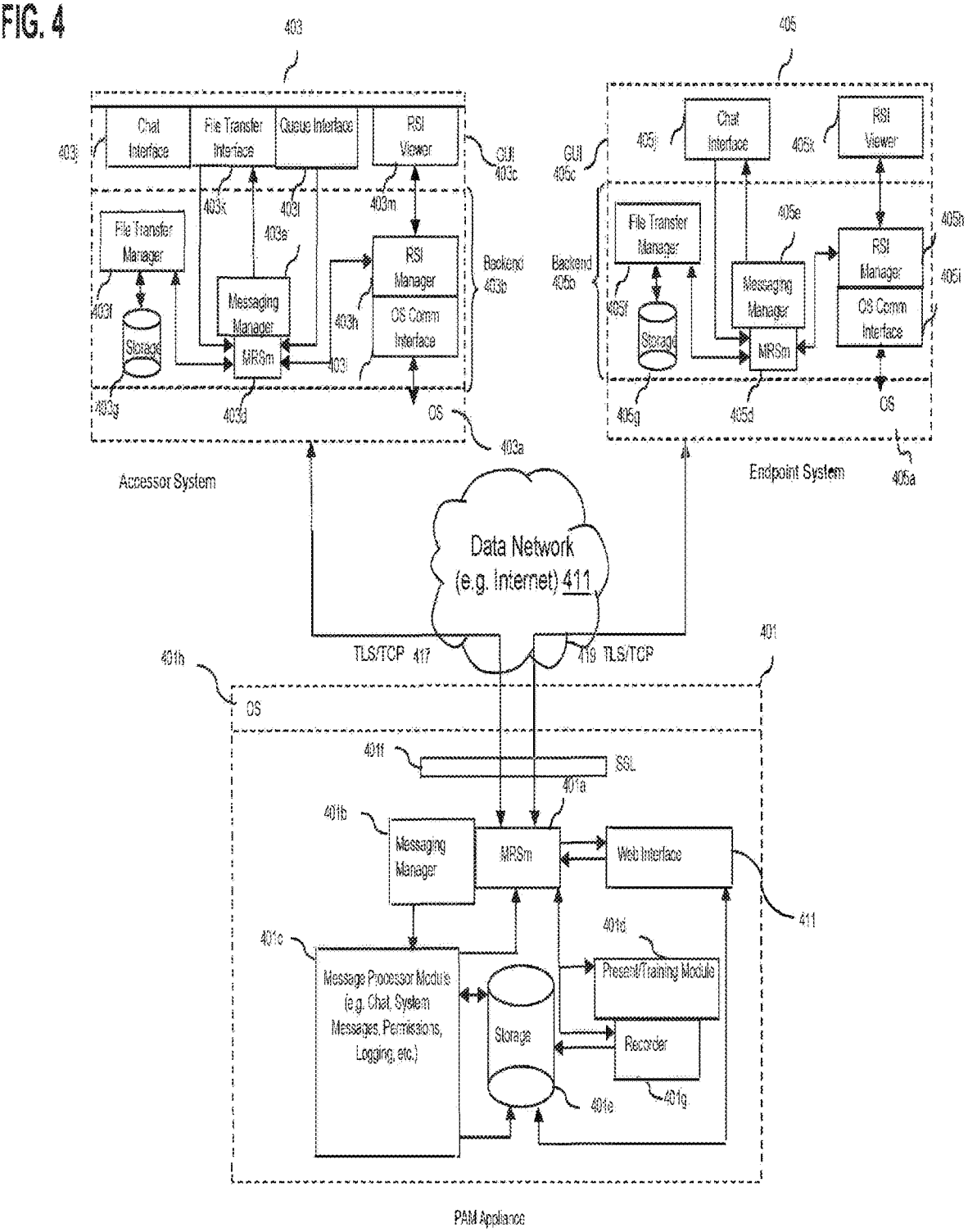
FIG. 4 is a diagram of the software architecture of the communication system of FIGS. 1A, 5, and 6 according to one embodiment.

FIG. 4 is a diagram of the software architecture of the communication system of FIG. 1, according to one embodiment. FIG. 4 illustrates various tools that are available in an access session, the communication mechanism for effective use of these tools in an access session via the PAM appliance under one embodiment. The product data transfer architecture, in one embodiment, is designed with the basis of a message handling and routing system called the Message Router System (MRS) which includes a collection of MRS modules (i.e., MRSm 401 a). The MRS provides a message routing engine that enables the routing of data from one router to another router. The MRSm's 401 a, 403 d, and 405 d provide a message routing system that enables the routing of data within envelopes among the appliance 401, accessor system 403 and endpoint system 405 with, for example, mailboxes as data endpoints. The mailboxes, which can be used for sending and receiving data, are also responsible for all handling of encoding (creation) and decoding of message envelopes with appropriately designed read and write methods. By way of example, the message envelope can include the following fields: a fromRouterID field specifying an identifier associated with the MRS 401 a, a toRouterAddress field specifying addressing information of the destination routing module.

In addition to the above described inter-router communication, the MRS can communicate with other modules within the application, including the appliance application, endpoint application, and the access console application, for example. These router instances provide the means for delivering the appropriate messages to destination modules within their respective applications.

In addition, the MRS 401 a can communicate with other modules in a manner similar to that described above. By way of example, the MRSm 401 a can communicate with the web interface 411, a message manager 401 b, a message processor module 401 c (includes chat, permission, logging, etc), a present/training 401 d, a secure layer module 401 f (e.g., SSL wrapper module), and a recorder module 401 g. The web interface 411 can communicate with other application modules via the MRS 401 a.

In an exemplary embodiment, the web interface 411 includes the following: (1) a network configuration web interface; (2) a User/Admin web interface which includes but not limited to user profile configuration, log reporting interface, and administrative user interface; (According to one embodiment, the web interface provides functions for configuring the appliance 401 to be deployed and integrated into the network infrastructure of the installer. In one embodiment, all other interfaces can communicate through the MRSm 401 a or to a storage module 401 e directly.

For ensuring proper dispatching of system messages received at the MRSm 401 a, a message manager 401 b can be used in this exemplary embodiment. These messages can include such data as chat data, session system data logging, system message posting, and system message queries, etc.

The message processor module 401 c receives system messages from MRSm 401 a via the message manager module 401 b. These messages can include such data as approval requests, notification requests, approval responses, session system data logging, system message posting, system message queries, permissions queries, and storage data retrievals.

The viewer module 401 d is configured to reduce the amount of screen update data transmitted from the client-side. In an exemplary embodiment, the viewer module 401 d includes the following components (not shown): a viewer component, and one or more remote screen image servers. These servers collect RSI change updates and send them on to the RSI viewer via the MRSm 401 a. The viewer component receives RSI update data from a client-side (remote-side in this case) server via the MRSm 401 a and then sends the data off to the active servers to be transmitted to the appropriate destination. The main stream of RSI update data can be transmitted to the appropriate client via the MRSm 401 a. Another stream of screen update data is transmitted to the recorder module 401 g to be written into the storage module 401 e.

The SSL module 401 f ensures that the data transfer between the appliance 401 and the accessor and endpoint system (403 and 405) is encrypted, e.g., 256-bit AES SSL encryption over links 417 and 419 across data network (e.g., Internet) 411.

In one embodiment, the remote access and control appliance 401 utilizes an operating system (OS) 401 h that supports a variety of applications. For example, a web server application can run on top of the OS 401 h to provide web hosting capabilities. The OS 401 h can also support SSL. The SSL wrapper module 401 f provides SSL over Transmission Control Protocol (TCP) or other network protocols.

As described, in one embodiment, the network appliance utilizes an OS 401 h with a web server for providing web hosting capabilities. The routing and handling module (e.g., MRSm) 401 a, which is a transport layer atop the OS 401 h, provides various network facilities. Accordingly, MRSm 401 a provides the generic means of transporting data from one system to another.

The MRSm 401 a of the network appliance 401 can communicate with the endpoint application of endpoint system 405, and the accessor application of the accessor system 403 or another appliance.

Under this example, the accessor system 403 and endpoint system 405 include operating systems 403 a, 405 a; backend components 403 b, 405 b; and GUIs 403 c, 405 c. The backend components 403 b of the accessor system 403 can include a MRSm 403 d, a message manager module 403 e, and a file transfer manager module 403 f. The module 403 f interfaces with a storage module 403 g, which is configured to store retrieved content stemming from the operation of the file transfer manager module 403 f. The backend components 403 b also include a RSI manager module 403 h. Yet another module 403 i (i.e., OS interface module), which is integral to the backend components 403 b, provides communication interfaces to the OS 403 a. As shown, the backend components 405 b of the endpoint system 405 resemble that of the backend components 403 b of the accessor system 403: a MRSm 405 d, a message manager module 405 e, and a file transfer manager module 405 f, a storage module 405 g, a RSI manager module 405 h, an OS interface module 405 i.

As for the GUI 403 c, the accessor system 403 can provide a number of interfaces depending on the applications. For instance, the GUI 403 c can include a chat interface 403 j, a file transfer interface 403 k, a queue interface 403 l, and a viewer 403 m. In this example, the endpoint system 405 utilizes a chat interface 405 j and a viewer 405 k. The GUI 403 c can include other interfaces such as remote command shell, system diagnostics, and system information to name a few. The GUI 405 c can include application specific chooser interface to only allow specific application viewing.

As explained with respect to the operation of the network appliance 401, the MRSm 403 d is the medium for handling all messages coming to the accessor application and all messages sent from the accessor application. The MRSm 403 d communicates with the message manager 403 e, a RSI manager 403 h, and the file-transfer manager modules 403 f. The system messages, session data, and chat data are delivered to the message manager module 403 e. The MRSm 403 d sends, as well as receives, system/control messages and RSI update data to and from the RSI manager module 403 *h*. The MRSm 403 *d* interacts with the file-transfer manager 403 *f* in sending and receiving system messages and file-transfer data.

The file-transfer manager 403 *f* handles all remote-to-local and local-to-remote (i.e. between the accessor system and the endpoint system) reading and writing of files. The system messages and file-transfer data are received and sent through the MRSm 403 *d*. Notably, the file-transfer interface module 403 *k* on the GUI component 403 *c* receives data from the MRSm 403 *d* and sends all data directly to the MRSm 403 *d*. Assuming the permissions to the endpoint file system access have been granted, the processes and steps involved in transferring a file from accessor storage 403 *g* to the endpoint storage 405 *g* include an initiation of a file transfer from the file-transfer GUI, a system command message sent to the MRSm 403 *d*. MRSm 403 *d* delivers the command to the file-transfer manager module 403 *f* to execute on constructing the data to be sent to MRSm 405 *d* of the endpoint system 405 via the MRSm 403 *d*. A system notification message is delivered to the message manager 403 *e* via MRSm 403 *d* to be displayed in the chat GUI 403 *j* after being delivered there by the message manager 403 *e*. The processes and steps involved in transferring a file from the endpoint to the accessor include an initiation from the file-transfer GUI 405 *k*, a system command message sent to the file-transfer manager 405 *f* via the endpoint MRSm 405 *d*. The file-transfer manager 405 *f* constructs a proper remote file transfer request, which is then sent through the endpoint MRSm 405 *d* to the accessor MRSm 403 *d* through the MRSm 401 *a* on the appliance. The accessor MRSm 403 *d* receives the request command, delivering it to the remote file-transfer manager 403 *f*, which in turn, receives the file system data requested to be transmitted back to the endpoint MRSm 405 *d* by the accessor MRSm 403 *d* through the MRSm 401 *a* on the appliance. The accessor MRS 403 *d* delivers the file system data received from the endpoint MRS 405 *d* to the file-transfer manager 403 *f* for processing and storing in the local file system storage 403 *g*. Also, a system notification message as well as a file-transfer GUI refresh command is delivered to the file-transfer GUI 403 *k* via the dispatcher 403 *e* from the MRS 403 *d*.

The RSI manager modules 403 *h* and 405 *h*, in one embodiment, includes the following components: a RSI updater, which "paints" the RSI viewer GUIs 403 *m* and 405 *k* with RSI screen update data; RSI server, which utilizes the OS Communication Interface modules 403 *i* and 405 *i*. The OS communication interface modules 403 *i* and 405 *i* interfaces with the OS system 403 *a* and 405 *a* for detecting and listening for screen and system updates, collecting these updates, and packaging and encoding these updates into data to be then sent to the viewing system via the respective MRSm's.

The RSI manager modules 403 *h* and 405 *h* can also provide the capability of reverse viewing. In this mode, the viewing of the remote system is reversed to being viewed by the remote system.

The network appliance 401 also permit support representatives to predict and lower the total cost of ownership (TCO) vis-à-vis the ASP model, in which the support representatives are typically charged a monthly fee. With the network appliance 401, representatives can predict their budget without monthly fees, surcharges or overages.

Figure 5:
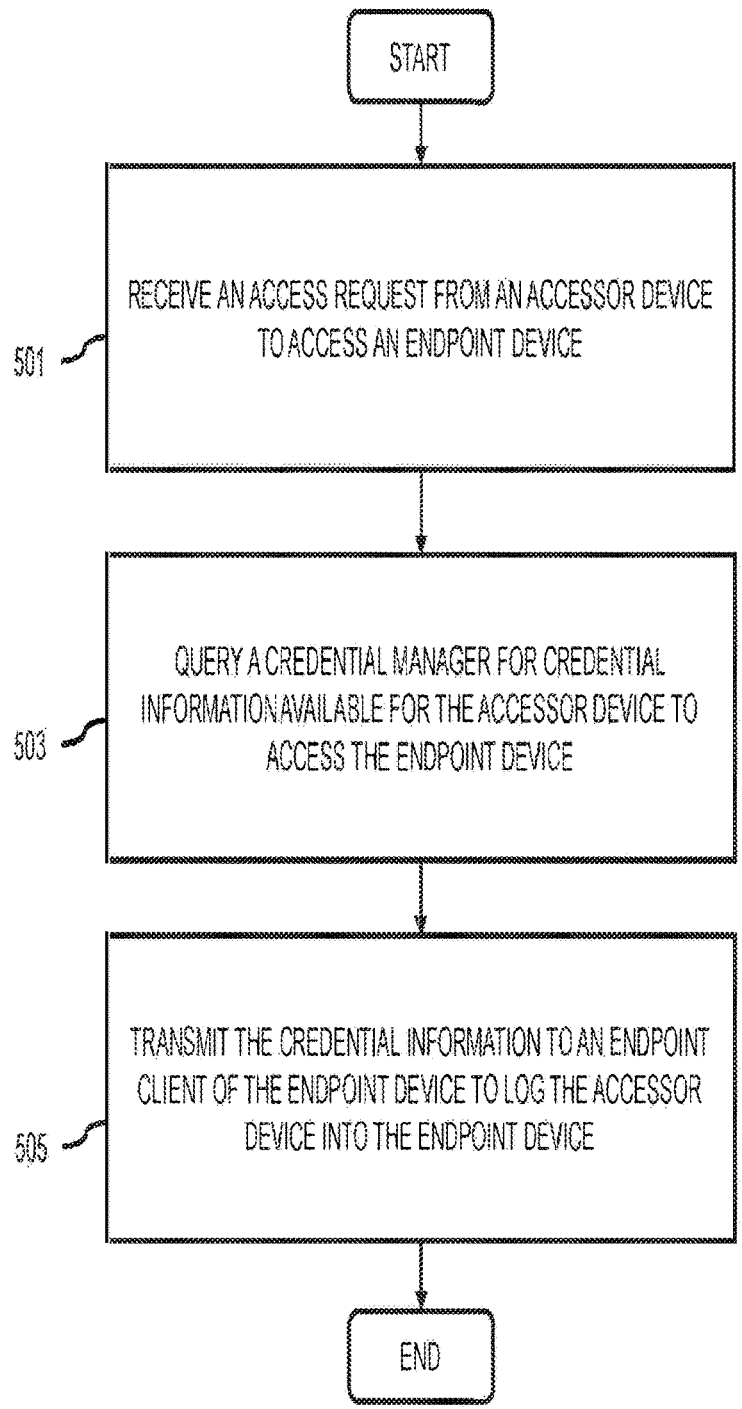
FIG. 5 is a flowchart of a process for securely and automatically handling credentials, according to one example embodiment.

FIG. 5 is a flowchart of a process for securely and automatically handling credentials, according to one example embodiment.

In step 501, the PAM appliance 101 receives an access request for an endpoint device 103 by an accessor device 105. In some embodiments, the endpoint device 103 is one of a plurality of endpoint devices within a network, and the PAM appliance 101 manages access rights to the plurality of endpoint devices within the network. In one embodiment, the PAM appliance 101 also manages network traffic among the plurality of endpoint devices, the accessor device 105, the credential manager 107, and other systems of the network (e.g., administrator device 113). In some embodiments, the access request may also be for privileged resources at the endpoint device 103 and not just only for access to the endpoint itself, but specific to the resource. Which may then proceed with the same process of providing access to the resource, thus the access is specific to the privileged resource of the endpoint 103 and not just the endpoint 103 in general.

In step 503, the PAM appliance 101 queries a credential manager 107 for credential information available for the accessor device 105 to access the endpoint device 103 based on an access policy assigned to the endpoint device 103. In one embodiment, the credential information may include non-privileged and privileged information, of which non-privileged information may be transmitted to the endpoint client for login of the accessor device 103 into the endpoint device 103.

In step 505, the PAM appliance 101 transmits the credential information to an endpoint client (e.g., an application or web client) of the endpoint device 103 to log the accessor device 105 into the endpoint device. In certain embodiments, the credential information is transmitted to the endpoint client 103 using a secure data stream and/or an encryption mechanism (e.g., use of encryption keys valid for the duration of a single transfer). In certain embodiments the endpoint client may log the accessor device 105 into the endpoint device 103 through an injection mechanism. The injection mechanism includes a programmatic method, a proxy-based credential injection into a protocol stream, an automatic keystroke entry, and/or a copying of the credential information into corresponding log-in fields.

Figure 6:
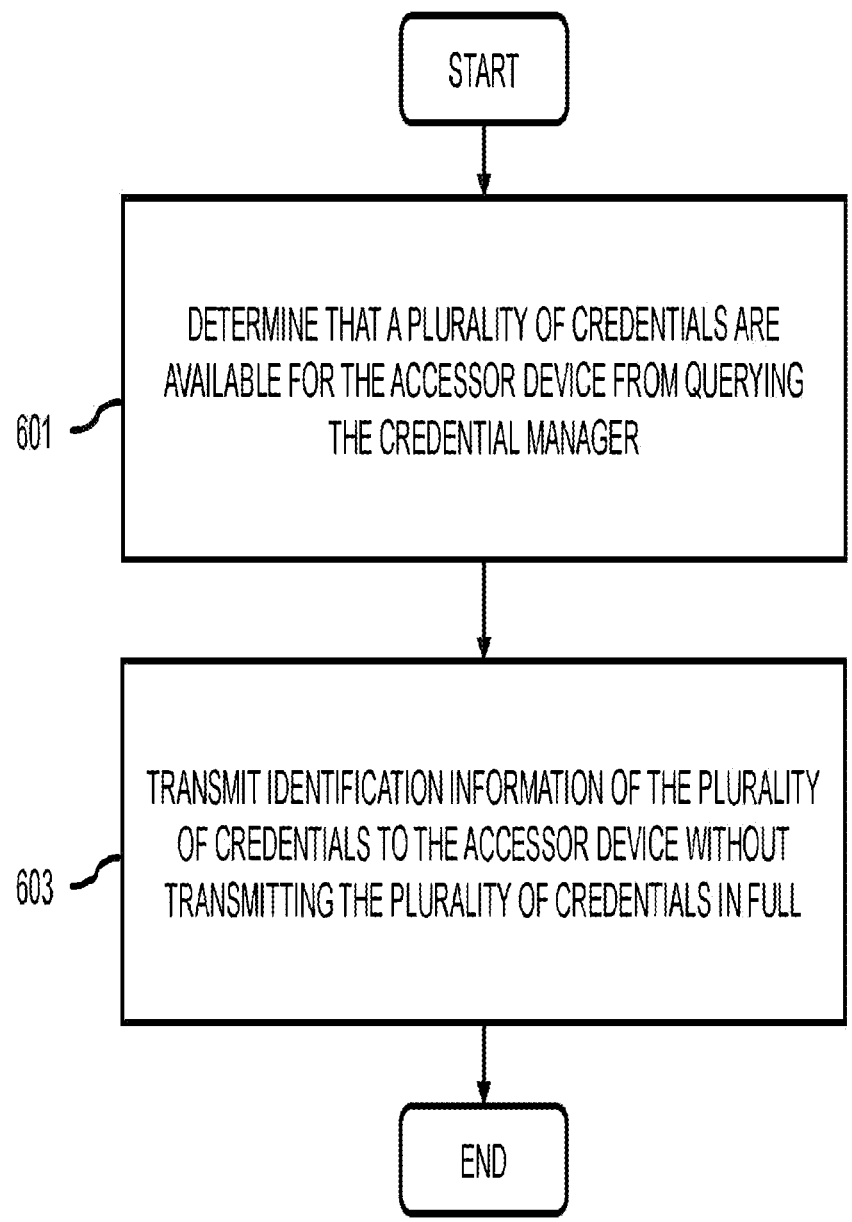
FIG. 6 is a flowchart of a process for handling a plurality of credentials, according to one example embodiment.

FIG. 6 is a flowchart of a process for handling a plurality of credentials, according to one example embodiment.

In step 601, the PAM appliance 101 determines that a plurality of credentials are available for the accessor device 105 and/or user of the accessor device 105 as queried from the credential manager 107, in order to provide access to the endpoint device 103 by the accessor device 105. In one embodiment, the plurality of credentials are privileged credentials, where the privileged credentials are also not provided to the accessor device 105 or an accessor client (e.g., application or web client).

In step 603, the PAM appliance 101 then transmits the identification information of the plurality of credentials (as well as privileged credentials) to the accessor device 105 and/or user of the accessor device without transmitting the plurality of credentials in full. The accessor device 105 then selects the credential information to use for access to the endpoint device 103, by selecting from a list generated using the identification information to represent the plurality of credentials. In some embodiments, each of the plurality of credentials may have a specific identification information associated with it. The identification information for the credentials may include name, nickname, and/or other identifier for the credential.

Figure 7:
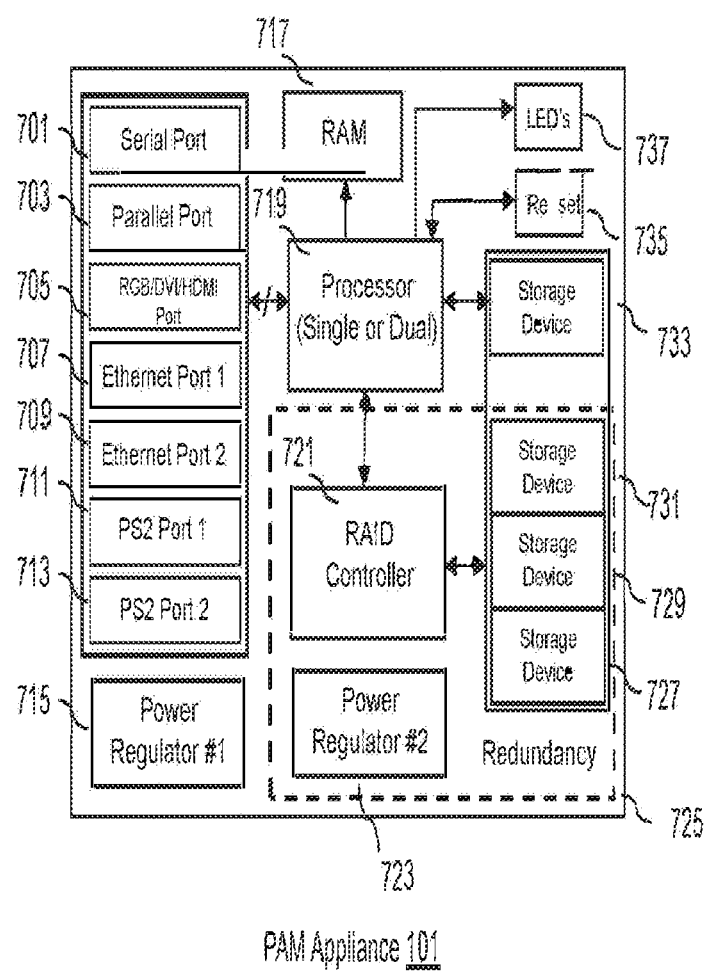
FIG. 7 is an exemplary hardware architecture of a remote access and control appliance, according to one embodiment.

FIG. 7 is an exemplary hardware architecture of a remote access and control appliance, according to an exemplary embodiment. The network appliance 101, in one embodiment, comprises various component interfaces, including serial and parallel ports 701 and 703, a display interface (e.g., an RGB (Red, Green and Blue) port 705), local area network (LAN) ports (e.g., Ethernet ports) 707 and 709, and input device ports (e.g., PS2) 711 and 713. The network appliance 101 also contains a power regulator 715, internal memory in the form of RAM (Random Access Memory) 717, one or more processors 719, each which may be a multi-core processor, LEDs (Light Emitting Diodes) 737, reset control 735 and a SATA (Serial Advanced Technology Attachment) storage drive 733.

As mentioned, the network appliance 101, in an exemplary embodiment, can be a 1U rack-mountable server hardware. However, it is contemplated that configurations other than those illustrated in FIG. 7 can be constructed, depending on the particular applications. For example, different types of appliances can be designed for different uptime requirements. With uptime-critical customers, the network appliance 101 provides hardware configuration 725 for fail-over redundancies; e.g., use of multiple disk drives 727-731, for Fail-over and Hot-Swap capabilities via a RAID (Redundant Array of Independent Disks) controller 721. This configuration 725 of the appliance 101 can also be equipped with a backup AC-DC (Alternating Current-Direct Current) regulator 723, which can be triggered when the main regulator 715 is detected as non-functional. Alternatively, for non-uptime-critical customers, the network appliance 101 can be configured without the additional hardware and/or software required for providing redundancies.

As earlier described, the network appliance 101, in an exemplary embodiment, can be a virtual appliance. Such software appliance can be run in a virtual environment. For instance, an image of the operating system and base software application can be installed on a virtual machine. Virtualization provides an abstraction layer that separates the operating system from the hardware, as to permit resource sharing. In this matter, different virtual machines (using heterogeneous operating systems) can co-exist on the same hardware platform.

The processes described herein for providing secure, on-demand remote support may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 8:
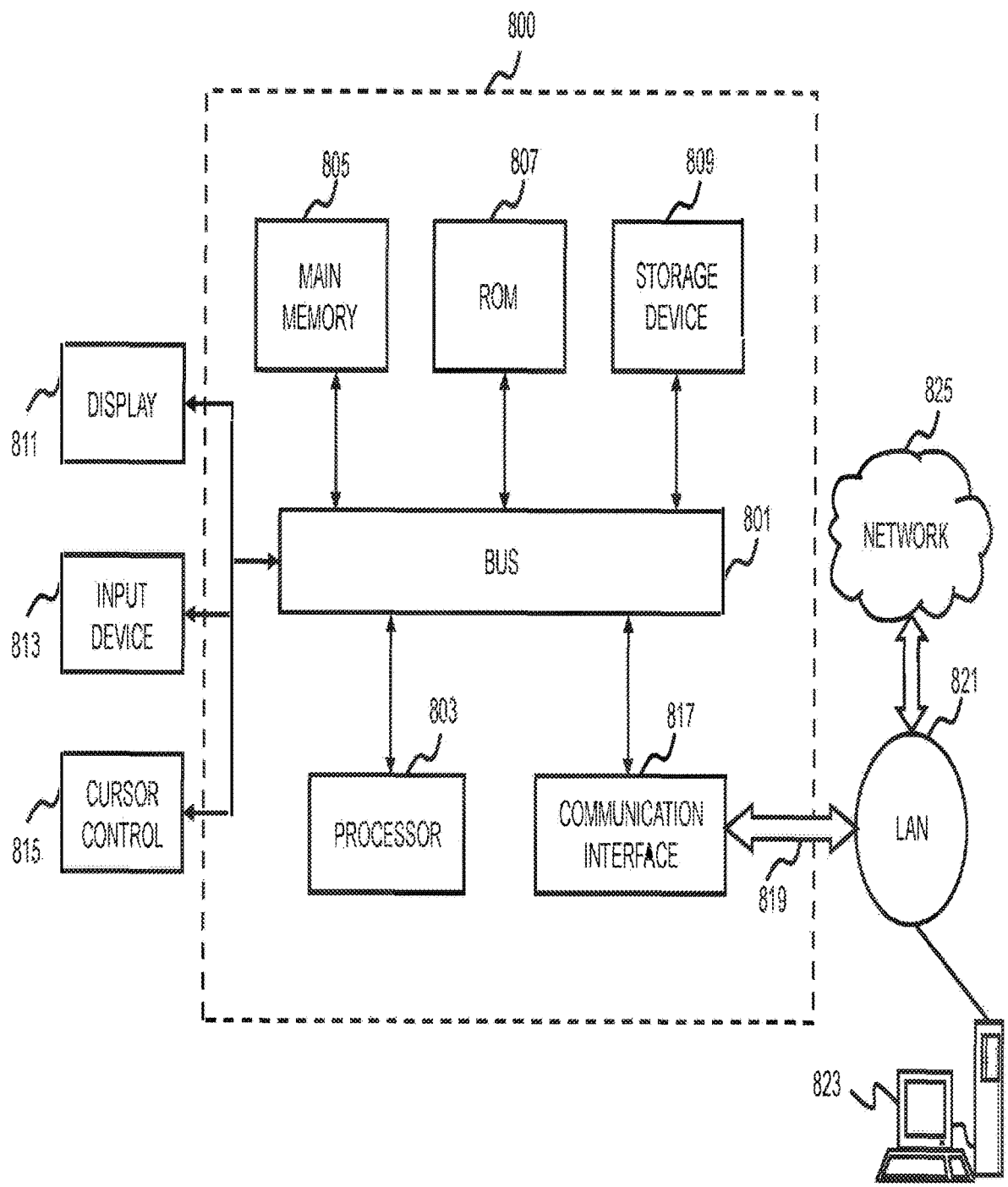
FIG. 8 is a diagram of a computer system that can be used to implement various embodiments.

FIG. 8 illustrates computing hardware (e.g., computer system) upon which an embodiment according to the invention can be implemented. The computer system 800 includes a bus 801 or other communication mechanism for communicating information and a processor 803 coupled to the bus 801 for processing information. The computer system 800 also includes main memory 805, such as random access memory (RAM) or other dynamic storage device, coupled to the bus 801 for storing information and instructions to be executed by the processor 803. Main memory 805 also can be used for storing temporary variables or other intermediate information during execution of instructions by the processor 803. The computer system 800 may further include a read only memory (ROM) 807 or other static storage device coupled to the bus 801 for storing static information and instructions for the processor 803. A storage device 809, such as a magnetic disk or optical disk, is coupled to the bus 801 for persistently storing information and instructions.

The computer system 800 may be coupled via the bus 801 to a display 811, such as a cathode ray tube (CRT), liquid crystal display, active matrix display, or plasma display, for displaying information to a computer user. An input device 813, such as a keyboard including alphanumeric and other keys, is coupled to the bus 801 for communicating information and command selections to the processor 803. Another type of user input device is a cursor control 815, such as a mouse, a trackball, or cursor direction keys, for communicating direction information and command selections to the processor 803 and for controlling cursor movement on the display 811.

According to an embodiment of the invention, the processes described herein are performed by the computer system 800, in response to the processor 803 executing an arrangement of instructions contained in main memory 805. Such instructions can be read into main memory 805 from another computer-readable medium, such as the storage device 809. Execution of the arrangement of instructions contained in main memory 805 causes the processor 803 to perform the process steps described herein. One or more processors in a multiprocessing arrangement may also be employed to execute the instructions contained in main memory 805. In alternative embodiments, hard-wired circuitry may be used in place of or in combination with software instructions to implement the embodiment of the invention. Thus, embodiments of the invention are not limited to any specific combination of hardware circuitry and software.

The computer system 800 also includes a communication interface 817 coupled to bus 801. The communication interface 817 provides a two-way data communication coupling to a network link 819 connected to a local network 821. For example, the communication interface 817 may be a digital subscriber line (DSL) card or modem, an integrated services digital network (ISDN) card, a cable modem, a telephone modem, or any other communication interface to provide a data communication connection to a corresponding type of communication line. As another example, communication interface 817 may be a local area network (LAN) card (e.g. for Ethernet™ or an Asynchronous Transfer Model (ATM) network) to provide a data communication connection to a compatible LAN. Wireless links can also be implemented. In any such implementation, communication interface 817 sends and receives electrical, electromagnetic, or optical signals that carry digital data streams representing various types of information. Further, the communication interface 817 can include peripheral interface devices, such as a Universal Serial Bus (USB) interface, a PCMCIA (Personal Computer Memory Card International Association) interface, etc. Although a single communication interface 817 is depicted in FIG. 8, multiple communication interfaces can also be employed.

The network link 819 typically provides data communication through one or more networks to other data devices. For example, the network link 819 may provide a connection through local network 821 to a host computer 823, which has connectivity to a network 825 (e.g. a wide area network (WAN) or the global packet data communication network now commonly referred to as the "Internet") or to data equipment operated by a service provider. The local network 821 and the network 825 both use electrical, electromagnetic, or optical signals to convey information and instructions. The signals through the various networks and the signals on the network link 819 and through the communication interface 817, which communicate digital data with the computer system 800, are exemplary forms of carrier waves bearing the information and instructions.

The computer system 800 can send messages and receive data, including program code, through the network(s), the network link 819, and the communication interface 817. In the Internet example, a server (not shown) might transmit requested code belonging to an application program for implementing an embodiment of the invention through the network 825, the local network 821 and the communication interface 817. The processor 803 may execute the transmitted code while being received and/or store the code in the storage device 809, or other non-volatile storage for later execution. In this manner, the computer system 800 may obtain application code in the form of a carrier wave.

The term "computer-readable medium" as used herein refers to any medium that participates in providing instructions to the processor 803 for execution. Such a medium may take many forms, including but not limited to non-volatile media, volatile media, and transmission media. Non-volatile media include, for example, optical or magnetic disks, such as the storage device 809. Volatile media include dynamic memory, such as main memory 805. Transmission media include coaxial cables, copper wire and fiber optics, including the wires that comprise the bus 801. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 9:
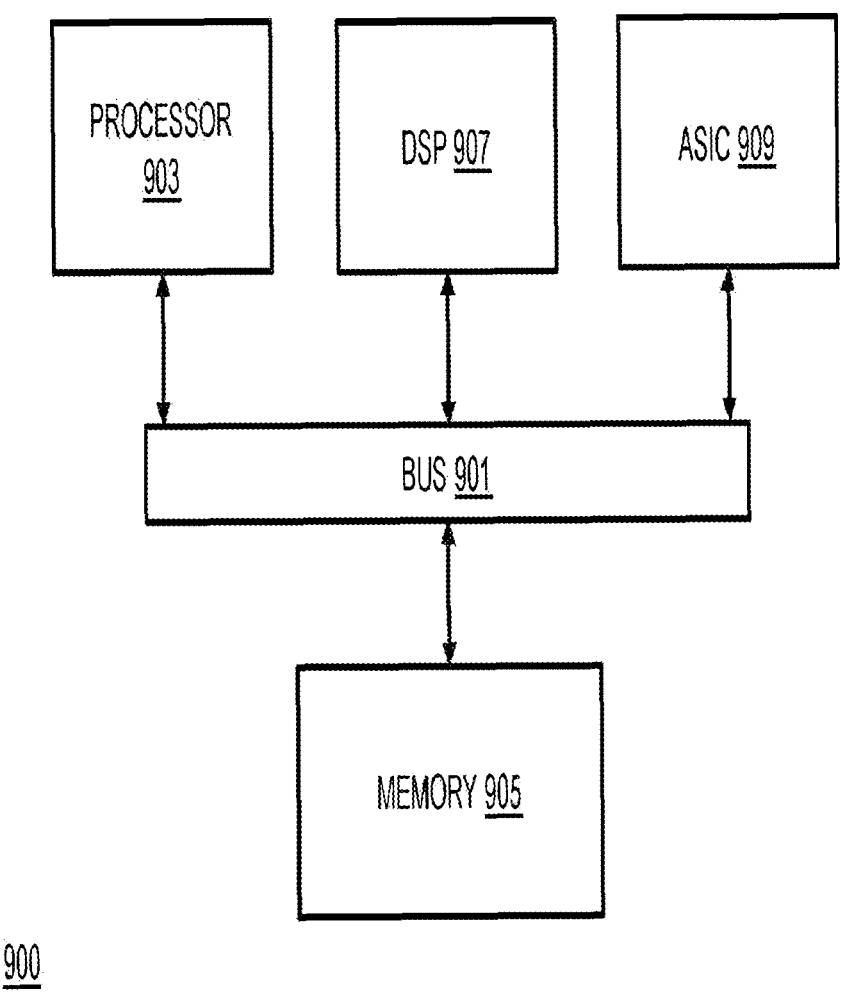
FIG. 9 is a diagram of a chip set that can be used to implement various exemplary embodiments.

FIG. 9 illustrates a chip set 900 upon which an embodiment of the invention may be implemented. Chip set 900 is programmed to present a slideshow as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 900, or a portion thereof, constitutes a means for performing one or more steps of FIGS. 1B, 5, and 6.

In one embodiment, the chip set 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to presenting a slideshow via a set-top box. The memory 905 also stores the data associated with or generated by the execution of the inventive steps.

While the invention has been described in connection with a number of embodiments and implementations, the invention is not so limited but covers various obvious modifications and equivalent arrangements, which fall within the purview of the appended claims.

The invention claimed is:

1. A system, comprising:
 a privilege access management (PAM) appliance comprising at least one first computing device, wherein the at least one first computing device is configured to:
   receive an access request from an accessor device to access an endpoint device;
   establish a session via a secure connection between the accessor device and the endpoint device;
   transmit a request for credential information available for the accessor device to access the endpoint device from a credential management device; and
 the credential management device comprises at least one second computing device, wherein the at least one second computing device is configured to:
   receive the request for credential information available for the accessor device to access the endpoint device;
   extract a set of credentials that are available for the accessor device from a plurality of credentials; and
   provide at least one of the set of credentials to the endpoint device for the accessor device for the session.

2. The system of claim 1, wherein the at least one second computing device is further configured to transmit identifying information for the set of credentials excluding full credentials to the PAM appliance.

3. The system of claim 2, wherein the at least one second computing device is further configured to provide at least one of the set of credentials to the endpoint device by securely transmitting the full credentials to the endpoint device.

4. The system of claim 3, wherein the at least one second computing device is further configured to securely transmit the full credentials through the PAM appliance.

5. The system of claim 1, wherein the at least one of the set of credentials is selected by the accessor device, via the PAM appliance, from the set of credentials.

6. The system of claim 1, wherein the request to transmit credential information is sent subsequent to the session being established by the PAM appliance.

7. The system of claim 1, wherein the at least one first computing device is further configured to:
receive a second selection of a second credential from the set of credentials via a user interface mechanism; and
run an application on the endpoint device as a different user corresponding to the second credential.

8. A method, comprising:
receiving, via a privilege access management (PAM) appliance, an access request from an accessor device to access an endpoint device;
establishing, via the PAM appliance, a session via a secure connection between the accessor device and the endpoint device;
transmitting, via the PAM appliance, a request for credential information available for the accessor device to access the endpoint device from a credential management device;
extracting, via the credential management device, a set of credentials that are available for the accessor device from a plurality of credentials; and
providing, via the credential management device, at least one of the set of credentials to the endpoint device for the accessor device for the session.

9. The method of claim 8, further comprising applying, via the credential management device, a policy to the plurality of credentials to determine the set of credentials.

10. The method of claim 8, further comprising providing, via the credential management device, at least one name for the at least one of the set of credentials to the PAM appliance excluding a full credential.

11. The method of claim 8, further comprising:
restricting the set of credentials based on a location of the accessor device; and
receiving, via the PAM appliance, a selection of one of the restricted set of credentials from the accessor device, wherein the at least one of the set of credentials comprises the one of the restricted set of credentials selected.

12. The method of claim 8, further comprising:
rendering, via the PAM appliance, a user interface comprising the set of credentials for the accessor device; and
receiving, via the PAM appliance, a selection of one of the set of credentials from the accessor device.

13. The method of claim 12, wherein the user interface excludes full credential information.

14. A non-transitory computer-readable medium embodying a program that, when executed by at least one computing device, causes the at least one computing device to:
receive an access request from an accessor device to access an endpoint device;
establish a session via a secure connection between the accessor device and the endpoint device;
transmit a request for credential information available for the accessor device to access the endpoint device from a credential management device;
receive information for at least one of a set of credentials available for the accessor device extracted from a plurality of credentials stored on the credential management device; and
provide the at least one of the set of credentials to the endpoint device for the accessor device for the session.

15. The non-transitory computer-readable medium of claim 14, wherein the program further causes the at least one computing device to determine that the set of credentials is available from the plurality of credentials for the accessor device, a user of the accessor device, or a combination thereof.

16. The non-transitory computer-readable medium of claim 14, wherein the program further causes the at least one computing device to transmit the credential information to an endpoint client of the endpoint device to log the accessor device into the endpoint device for the session.

17. The non-transitory computer-readable medium of claim 16, wherein the program further causes the at least one computing device to provide the endpoint client as a downloadable application to the endpoint.

18. The non-transitory computer-readable medium of claim 14, wherein the program further causes the at least one computing device to receive the access request from the accessor device via a web interface on a public IP address.

19. The non-transitory computer-readable medium of claim 14, wherein the program further causes the at least one computing device to determine that the accessor device has credentials to access resources of the endpoint device, wherein the request for credential information available for the accessor device is transmitted in response to determining that the accessor device has credentials.

20. The non-transitory computer-readable medium of claim 14, wherein the session is established through the at least one computing device.

* * * * *